(12) United States Patent
Eger

(10) Patent No.: US 11,022,481 B2
(45) Date of Patent: Jun. 1, 2021

(54) LOAD CELL HAVING COMPENSATION OF TEMPERATURE DIFFERENCES

(71) Applicant: Bizerba SE & Co. KG, Balingen (DE)

(72) Inventor: Thomas Eger, Burladingen (DE)

(73) Assignee: Bizerba SE & Co. KG, Balingen (DE)

( * ) Notice: Subject to any disclaimer, the term of this patent is extended or adjusted under 35 U.S.C. 154(b) by 0 days.

(21) Appl. No.: 16/312,915

(22) PCT Filed: Jun. 23, 2017

(86) PCT No.: PCT/EP2017/065522
§ 371 (c)(1),
(2) Date: Dec. 21, 2018

(87) PCT Pub. No.: WO2018/001886
PCT Pub. Date: Jan. 4, 2018

(65) Prior Publication Data
US 2019/0170566 A1    Jun. 6, 2019

(30) Foreign Application Priority Data
Jun. 27, 2016   (DE) ...................... 10 2016 111 729.3

(51) Int. Cl.
*G01G 3/14*       (2006.01)
*G01G 3/18*       (2006.01)
(Continued)

(52) U.S. Cl.
CPC ............ *G01G 3/1418* (2013.01); *G01G 3/18* (2013.01); *G01K 7/02* (2013.01); *G01K 7/16* (2013.01)

(58) Field of Classification Search
CPC .... G01G 23/01; G01G 21/244; G01G 23/005; G01G 3/1418; G01G 3/18; G01L 1/16;
(Continued)

(56) References Cited

U.S. PATENT DOCUMENTS 2,930,224 A * 3/1960 Bodner ................. G01L 1/2281
                                                           73/766
3,290,928 A * 12/1966 Curry .................... G01L 1/2262
                                                           73/766
(Continued)

FOREIGN PATENT DOCUMENTS

DE    197 02 714 B4    11/1997
DE    103 53 414 B3    1/2005
(Continued)

OTHER PUBLICATIONS

German Search Report dated Mar. 1, 2017 in related German Patent Application No. 10 2016 111 729.3 (two pages).

(Continued)

*Primary Examiner* — Octavia Hollington
(74) *Attorney, Agent, or Firm* — Kilpatrick Townsend & Stockton LLP

(57) ABSTRACT

The invention relates to a load cell for a scale, comprising a measuring device for producing a temperature-dependent weight measurement signal corresponding to an acting weight and at least one temperature sensor for measuring a temperature of the load cell, wherein a temperature-compensated weight can be calculated by an evaluating unit from the produced weight measurement signal and the measured temperature. The temperature sensor is designed as a sensor, in particular a thermocouple, that measures a temperature difference between a first point, in particular a measurement point, of the load cell and a second point, in particular a comparison point, of the load cell.

19 Claims, 3 Drawing Sheets

Figure 1:
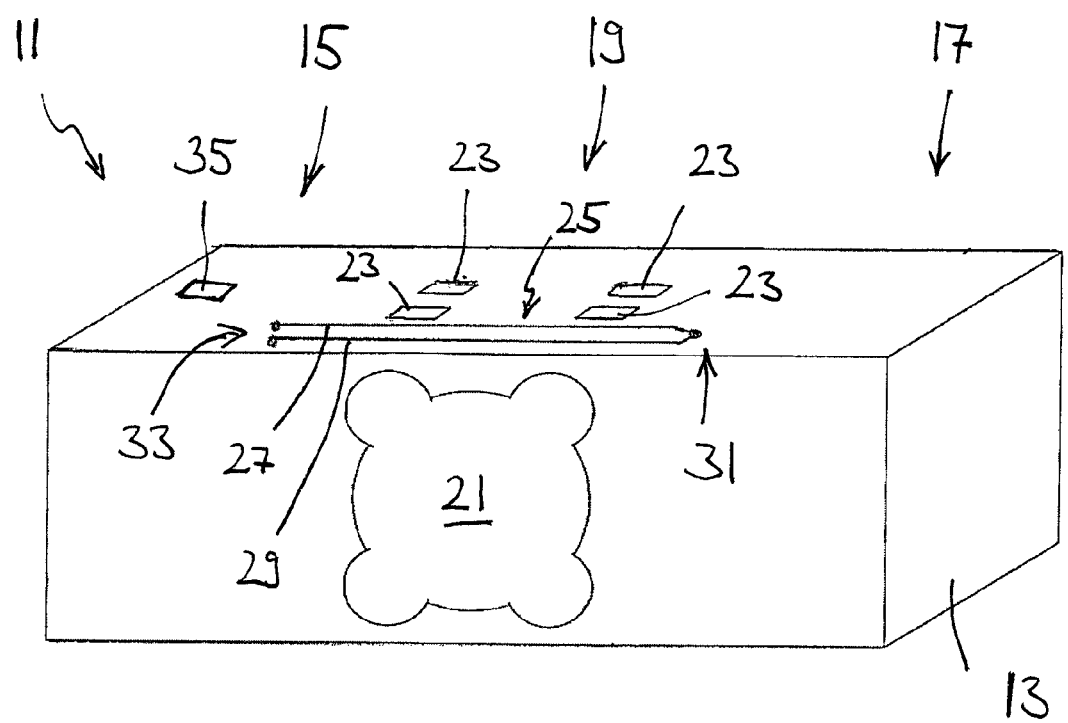

(51) Int. Cl.
*G01K 7/02* (2021.01)
*G01K 7/16* (2006.01)

(58) Field of Classification Search
CPC .......... G01L 1/04; G01L 1/26; G01L 1/2243;
G01K 7/02; G01K 7/16
USPC .................. 73/766, 862.623, 862.626, 856,
73/862.331–862.338
See application file for complete search history.

(56) References Cited

U.S. PATENT DOCUMENTS

| | | | |
|---|---|---|---|
| 3,293,909 A | | 12/1966 | Gledhill |
| 4,325,048 A | * | 4/1982 | Zaghi .................... G01L 1/2225 338/3 |
| 4,733,322 A | * | 3/1988 | Harper ................... G01R 17/06 361/103 |
| 4,914,611 A | | 4/1990 | Yamanaka et al. |
| 7,051,603 B2 | * | 5/2006 | Loher .................... G01G 3/1414 73/856 |
| 7,361,867 B2 | * | 4/2008 | Von Steuben ......... G01G 23/48 219/494 |
| 7,478,001 B2 | * | 1/2009 | Fasig .................... G01G 19/12 177/136 |
| 2006/0216004 A1 | | 9/2006 | Von Steuben et al. |
| 2012/0173168 A1 | * | 7/2012 | Koppel ................... G01G 3/18 702/44 |

FOREIGN PATENT DOCUMENTS

| | | | |
|---|---|---|---|
| EP | 19702714 | * | 11/1997 |
| GB | 1 263 182 A | | 2/1972 |
| GB | 1 523 301 A | | 8/1978 |
| WO | 2011/009957 A1 | | 1/2011 |

OTHER PUBLICATIONS

International Search Report dated Aug. 21, 2017 in related PCT application No. PCT/EP2017/065522 (four pages).

* cited by examiner

LOAD CELL HAVING COMPENSATION OF TEMPERATURE DIFFERENCES

This application is a U.S. National Phase Application of PCT/EP2017/065522, filed Jun. 23, 2017, which claims the priority of German Patent Application 10 2016 111 729.3, filed Jun. 27, 2016, the entireties of which are incorporated by reference herein.

The present invention relates to a load cell for a scale, having a measuring device, for example a Wheatstone bridge formed from strain gauges, for generating a temperature-dependent weight measurement signal corresponding to an acting weight and having at least one temperature sensor for measuring a temperature of the load cell, wherein a temperature-compensated weight can be calculated from the generated weight measurement signal and from the measured temperature by means of an evaluation unit.

As long as a scale is switched off over a longer period of time, all the components of the scale have at least substantially the same temperature that corresponds to the environmental temperature of the scale. However, as soon as the scale is powered up, this has the result that the components operated by power first heat up and they then also emit their heat to the other components, with a stationary state finally being adopted. This also relates to the load cell so that regions having different temperatures form there until a stationary state has been adopted. These temperature changes of the load cell can falsify the weight measurement signal of the measuring device and can thus lead to errors in the weight determination of the scale. This phenomenon is generally called the power-up drift.

To compensate the power-up drift caused by the thermal losses released by the electronics of the scale on a putting into operation, it is known from the document DE 103 53 414 B3 to correct the generated weight measurement signal of an EMF load cell in dependence on the time duration since the powering up of the scale. In this respect, an initial correction value is first determined that is dependent on how long the scale was switched off before the powering up (shutdown time). The initial correction value can be determined with the aid of a real time clock, of a temperature sensor that is arranged outside the electronics of the scale arranged in the region of the load cell and that measures a respective absolute temperature at two points in time, or of two temperature sensors of which one is arranged in the region of the electronics arranged outside the load cell and one is arranged in the region of the load cell and which each measure an absolute temperature. A correction function converging toward zero is then calculated from the initial correction value and from a predefined decay function and the time development of the temperature-dependent weight measurement signal, i.e. the power-up drift, is corrected using said correction function.

It is the underlying object of the invention to provide a possibility of increasing the accuracy of the temperature compensation on a weight determination of a scale.

This object is satisfied by a load cell having the features of claim 1 and in particular in that the temperature sensor is configured as a temperature sensor measuring a temperature difference between a first point of the load cell and a second point of the load cell.

In accordance with the invention, a temperature difference between two points is not determined by two temperature sensors that each per se measure an absolute temperature, with a temperature difference being calculated from the two absolute temperatures, but a temperature difference is rather measured directly by one temperature sensor. The absolute temperature at the one point and/or at the other point is of no significance at all here. A directly measured temperature difference value is less susceptible to error than a temperature difference value calculated from two temperature measurements. A systematic error in the form of a zero point shift can in particular not occur.

The temperature difference can be measured by a thermocouple. A thermocouple comprises two electrical conductors of different materials that are connected to one another at one side, with a voltage being applied to the two open ends of the conductors that is dependent on a temperature difference along the two conductors. The side of the mutual connection is here located at the so-called measurement point; the two open ends of the conductors at the so-called comparison point. A device that can process and/or evaluate the signal of the thermocouple can be connected to the open ends of the conductors. Copper and constantan or nickel and constantan can be considered as the material combination for the two conductors. Materials are preferably selected for the two conductors that have thermoelectric coefficients that are as far apart as possible.

It is furthermore of advantage that both points that are used as the basis for the measurement of the temperature difference are elements of the load cell or are disposed on the load cell and are not one of the two points outside the load cell. The measurement of the temperature difference thus takes place in direct proximity to the measuring device whose error on the generation of the weight measurement signal is to be corrected, i.e. the local temperature conditions in the region of the measuring device can be determined with a higher reliability, whereby the accuracy of the temperature compensation can be further increased.

A temperature sensor measuring a temperature difference between a first point and a second point can also be called a temperature difference measuring sensor. A plurality of temperature sensors, in particular thermocouples, can also be provided that are each configured to measure a respective temperature difference between a respective first point of the load cell and a respective second point of the load cell. A respective temperature difference can then be measured in different regions or at different points of the load cell. The calculation of the temperature-compensated weight can then take place on the basis of the plurality of temperature differences measured by the plurality of temperature sensors.

The load cell can comprise a spring body that is in particular configured as a bending bar and the measuring device can comprise one or more strain gauges for detecting the elastic deformation of the spring body to generate a weight measurement signal. The strain gauge or strain gauges and the temperature sensor measuring a temperature difference are then each arranged on the spring body. Such a load cell is called a strain gauge load cell. The strain gauges are typically connected to one another in the form of a measuring bridge, in particular a Wheatstone bridge. In general, however, the load cell in accordance with the invention can also be a load cell according to the principle of electromagnetic force compensation, i.e. an EMF load cell. One of the two points is then preferably arranged in the region of the coils of the EMF load cell, the other point is preferably remote therefrom.

As a rule, the spring body of a strain gauge load cell has a force reception section, a force introduction section, and a deformation section arranged between the force reception section and the force introduction section. The force reception section is in a fixed position, the force introduction section is connected to a load plate of the scale. The temperature sensor measuring a temperature difference preferably extends beyond the deformation section, in particular such that the first point lies on the force introduction section and the second point lies on the force reception section, or vice versa. The temperature sensor measuring a temperature difference can, however, generally also be arranged at a different point, in particular for reasons of space optimization, in particular outside the deformation section. The temperature sensor can, for example, be arranged in a corner of the spring body and the two conductors can be angled at a right angle, in particular corresponding to the corner.

It can be preferred if the strain gauge or strain gauges and one of two conductors of the thermocouple are produced from the same material. The thermocouple can thus be integrated in the already existing structure with the strain gauge or strain gauges. The two conductors of the thermocouple can each be configured as conductor tracks. The one conductor track can in particular be arranged on a first conductor plane and the other conductor track can be arranged on a second conductor plane disposed above or below the first conductor plane.

Furthermore, a further temperature sensor for measuring an absolute temperature can be provided—in addition to the temperature sensor measuring a temperature difference. This further temperature sensor can be used for correcting the zero point of the scale in the steady state, i.e. when a state has been adopted after the powering up of the scale that is stationary with respect to the heating of the scale and to the thermal distribution over the scale. The absolute temperature can furthermore also be used for correcting the characteristic values of the load cell determined in the calibration of the load cell. This correction is, however, independent of the correction of the power-up drift by means of the temperature sensor measuring a temperature difference. Both correction procedures can, however, be superposed on one another. The further temperature sensor for measuring an absolute temperature can be arranged on the aforesaid force reception section, on the aforesaid force introduction section, or on the aforesaid deformation section.

In accordance with an embodiment of the invention, the thermocouple comprises two electrical conductors, wherein at least one of the two conductors additionally comprises a temperature-dependent electrical resistor element or is configured as a temperature-dependent electrical resistor. In accordance with this embodiment, a resistor element can therefore be integrated in the thermocouple. An absolute temperature can also be measured in addition to a temperature difference using the component hereby provided as will be explained in more detail in the following. This component is consequently a combination of a thermocouple and an absolute temperature sensor. Connector pins and circuit elements in an evaluation unit or on evaluation electronics can hereby be saved. The additional temperature-dependent electrical resistor element can be configured as a meandering conductor, for example.

The present invention furthermore relates to a scale having a load cell as has been described above.

An evaluation unit is in particular provided, in particular having an analog/digital converter and/or a control unit, that is configured to calculate a temperature-compensated weight from the generated weight measurement signal and the measured temperature difference. The evaluation unit can here be an element of the load cell or can be arranged outside the load cell as an element of the scale.

The evaluation unit for calculating the temperature-compensated weight is preferably identical to the evaluation unit for evaluating the weight measurement signals of the measuring device. Accordingly, the evaluation unit anyway already present in a conventional scale for evaluating the weight measurement signals of the measuring device can be used for calculating the temperature-compensated weight. If the evaluation unit is surrounded by the load cell, the load cell can be called a digital load cell; otherwise it is an analog load cell. The weight measurement signals of the measuring device and the temperature differences of the temperature sensor measuring a temperature differences are output as digital signals by a digital load cell; they are output as analog signals with an analog load cell.

In accordance with a preferred embodiment, the evaluation unit is configured such that the temperature-compensated weight is calculated continuously from the respective currently generated weight measurement signal and from the respective currently measured temperature difference. The time progression of the temperature-compensated weight is accordingly not calculated using a predefined decay function as known from the prior art, but rather using current measurement values so that the temperature compensation can take place with a much higher reliability and accuracy. The temperature compensation in accordance with the invention using current measurement values further makes it possible that errors can also be compensated that are based on a different heating than by the electronics of the scales, for example on a heating by hot weights, with a plurality of heat sources, in particular different heat sources, also being able to be present.

It has been found that the temperature-compensated weight can be calculated using a simple mathematical function. A linear or quadratic function can in particular form the basis of the calculation of the temperature-compensated weight from the generated weight measurement signal and from the measured temperature difference. Only a small calculation effort is then required. However, a higher degree polynomial function can also be used as the basis for the calculation.

If the thermocouple comprises two electrical conductors, wherein at least one of the two conductors additionally comprises a temperature-dependent electrical resistor element, as has been explained above, the evaluation unit can be adapted to apply a DC current having a predefined polarity to the thermocouple and subsequently to apply a DC current of the opposite polarity and in so doing to measure the respective voltage dropping at the thermocouple and to determine an absolute temperature and/or a temperature difference from the two measured voltages.

Alternatively or additionally, the evaluation unit can be adapted to apply an AC voltage to the thermocouple, to measure the effective value of the voltage dropping at the thermocouple in this respect, and to calculate an absolute temperature therefrom and/or, with a thermocouple having neither current nor voltage applied, to measure the voltage dropping at the thermocouple and to determine a temperature difference herefrom.

Advantageous embodiments of the invention are described in the dependent claims, in the description of the Figures, and in the drawing.

The invention further relates to a method relating to the operation of a scale having a load cell in which a temperature-dependent weight measurement signal is generated that corresponds to an acting weight and a temperature difference is measured between a first point of the load cell and a second point of the load cell, with a temperature-compensated weight being calculated from the generated weight measurement signal and from the measured temperature.

Advantageous embodiments of the method result in an analog manner from the further developments of the load cell in accordance with the invention and/or of the scale.

Figure 2:
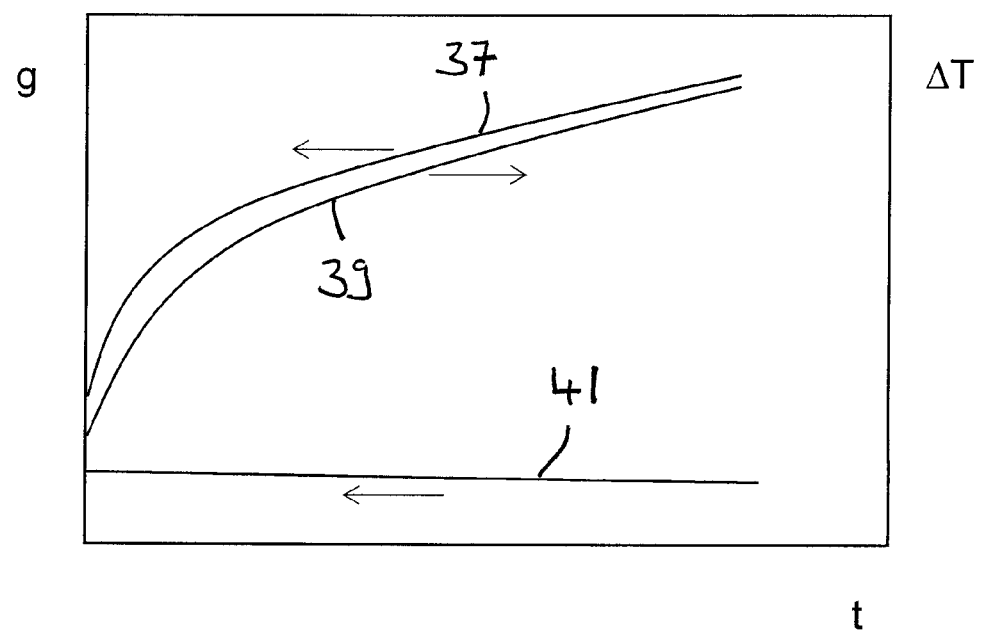
Figure 3:
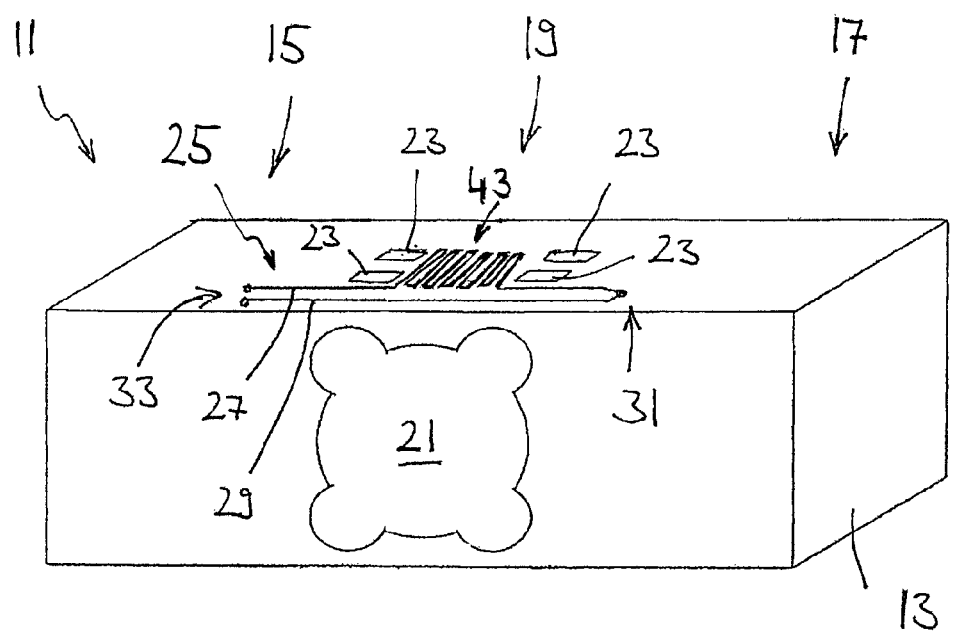

The invention will be described in the following by way of example with reference to the drawing. There are shown, schematically in each case FIG. 1 a load cell in accordance with the invention;

FIG. 2 the progression of a temperature-compensated weight calculated in accordance with the invention; and FIG. 3 a load cell in accordance with the invention in accordance with a further embodiment.

A load cell 11 of a scale, not otherwise shown, is shown in FIG. 1 having a spring body 13 that is produced as a double bending beam composed of e.g. aluminum or stainless steel. The spring body 13 comprises a force reception section 15 and a force introduction section 17. The spring body 13 is fixedly clamped to the force reception section 15; the spring body 13 is connected to a load plate at the force introduction section 17. A deformation section 19 in which an opening 21 is formed that fully passes through the spring body 13 is provided between the two sections 15 and 17.

A load on the force introduction section 17 produces a deflection or a bend of the spring body 13 proportional hereto. Four strain gauges 23 are attached to the outer side of the spring body 13 above the opening 21 that are connected as a Wheatstone bridge and that detect a deformation of the spring body 13 in a known manner in the region of the deformation section 19, wherein a weight measurement signal 37 is generated that corresponds to the acting force (cf. FIG. 2). The load cell 11 is therefore a strain gauge load cell. The evaluation unit by which the weight measurement signal 37 of the Wheatstone bridge 23, a bridge voltage, is evaluated is located outside the load cell 11 in the embodiment described. The evaluation unit can, however, equally be an element of the load cell 11.

The weight measurement signal 37 of the strain gauges 23 is, however, temperature-dependent since, on the one hand, the spring body 13 expands on a change of the temperature and, on the other hand, the electrical resistors of the strain gauges 23 are temperature-dependent. This is in particular a problem on the powering up of the scale (power-up drift) since the electronics of the scale then output a power loss and a temperature change consequently occurs at this point in time until a balance state has been adopted with respect to the temperature distribution. The load cell 11 is also affected by this temperature change. If the electronics of the scale are, for example, arranged in the proximity of the force reception section 15, the load cell 11 is supplied with heat coming from this side, with ultimately a temperature gradient being adopted over the load cell 11 with a warmer force reception section 15 and with a force introduction section 17 colder in comparison therewith.

To compensate the temperature changes that falsify the weight measurement signal 37 and that are caused on the powering up of the scale and/or in another manner, a temperature sensor 25 in the form of a thermocouple is additionally arranged on the spring body 13. The thermocouple 25 is configured as known from the prior art and comprises a first conductor 27 composed of a first material and a second conductor 29 composed of a second material different from the first, wherein the two materials have different thermoelectric coefficients and the two conductors 27, 29 are connected to one another at their right ends in FIG. 1. The measurement point 31 of the thermocouple 25 is here located in the region of the force introduction section 17 of the load cell 11; the comparison point 33 is in the region of the force reception section 15.

The thermocouple 25 generates a voltage 39 (cf. FIG. 2) in a known manner at the two free ends of the two conductors 27 and 29 at the comparison point 33, said voltage 39 being dependent on the temperature difference between the measurement point 31 and the comparison point 33. The temperature difference between the measurement point 31 and the comparison point 33 can therefore be measured using the thermocouple 25. This temperature difference can be measured directly without the measurement of an absolute temperature being necessary.

The voltage 39 generated by the thermocouple 25 is likewise forwarded to the aforesaid evaluation unit that also evaluates the weight measurement signal 37 of the Wheatstone bridge 23. The evaluation unit is then configured to calculate a temperature-compensated or temperature-corrected weight 41, such as is shown by way of example in FIG. 2, from the respective current weight measurement signal 37 of the Wheatstone bridge 23 and from the respective current voltage signal 39 of the thermocouple 25.

The curves 37, 39, 41 over the time t are each shown in a linear representation, with the curves 37 and 41 indicating a weight in gram g and the curve 39 indicating a temperature difference in degrees Celsius ΔT. The stationary state in which the temperature distribution over the load cell 11 has settled, has not yet been reached in FIG. 2. As can be seen from FIG. 2, the time change of the weight measurement signal 37 after the powering up of the scale runs at least substantially analog to the time change of the temperature difference 39. The calculation of the temperature-corrected weight 41 can therefore take place in a good approximation in a simple manner on the basis of a linear or quadratic function whose terms comprise the weight measurement signal 37 and the measured temperature difference 39.

A further temperature sensor 35 for measuring an absolute temperature of the load cell 11 is furthermore shown in FIG. 1 that is arranged in the region of the force reception section 15. The characteristic values of the load cell 11 and the zero point location of the temperature-corrected weight 41 determined on their calibration can be verified and readjusted under certain circumstances by this only optionally provided temperature sensor 35.

A further embodiment of a load cell 11 in accordance with the invention is shown in FIG. 3, with the same elements or elements of the same function with respect to FIG. 1 being provided with the same reference numerals in FIG. 3 as in FIG. 1. The embodiment in accordance with FIG. 3 ultimately only differs from the embodiment in accordance with FIG. 1 in that the further temperature sensor 35 for measuring an absolute temperature was replaced with a temperature-dependent electrical resistor element 43 integrated in the thermocouple 25, in particular in the conductor 27 of the thermocouple 25. The resistor element 43 is here configured in FIG. 3 as a thin, meandering conductor strip composed of the same material as the conductor 27 of the thermocouple 25, for example of nickel. The other conductor 29 can then be produced from constantan, for example. A thermocouple 25 is hereby present having an absolute temperature sensor integrated therein, as will be explained in more detail in the following.

If the thermocouple 25 is acted on by a constant DC current at the two free ends of the two conductors 27 and 29 at the comparison point 33, a voltage can be tapped or measured there that corresponds to the sum of the voltage generated by the thermocouple 25 due to a temperature difference between the measurement point 31 and the comparison point 33, called thermovoltage in the following, and of the voltage dropping over the resistor element 43. A voltage is obtained by reversing the polarity of the constant current that corresponds to the difference from the thermovoltage and the voltage dropping over the resistor element 43. The voltage over the temperature-dependent resistor element 43 is obtained from the mean value of the absolute values of the two measurements and the absolute temperature of the load cell 11 at the point at which the resistor element 43 is arranged can be determined from it. Furthermore, double the thermovoltage of the thermocouple 25 is obtained from the difference of the absolute values of the two measurements and the temperature difference between the measurement point 31 and the comparison point 33 can be determined from it. The evaluation unit here takes over both the function of a DC current source and the function of a DC voltage measurement device and also carries out the aforesaid calculations.

Alternatively, an AC voltage can also be applied, in each case by means of the evaluation unit that then acts as an AV voltage source and as an AC voltage measurement device, to the two free ends of the two conductors 27 and 29 at the comparison point 33 of the thermocouple 25 and the effective value of the voltage dropping there can be measured. This ultimately corresponds to the above-explained mean value formation so that a conclusion can be drawn from the effective value on the voltage dropping over the resistor element 43 and thus on the absolute temperature in the region of the resistor element 43.

If—in another respect analog to the procedure in the embodiment in accordance with FIG. 1—the voltage dropping at the thermocouple 25 is measured without the thermocouple 25 having a current or a voltage applied, the measured voltage corresponds to the aforesaid thermovoltage, i.e. to the voltage generated by the thermocouple 25 due to a temperature difference between the measurement point 31 and the comparison point 33.

The temperature dependence of the weight measurement signal of a scale can be compensated with a high accuracy using the thermocouple in accordance with the invention and the evaluation unit configured in accordance with the invention.

REFERENCE NUMERAL LIST

11 load cell
13 spring body
15 force reception section
17 force introduction section
19 deformation section
21 opening
23 strain gauge
25 thermocouple
27 conductor
29 conductor
31 measurement point
33 comparison point
35 further temperature sensor
37 weight measurement signal
39 voltage signal
41 temperature-compensated weight
43 temperature-dependent resistor element

The invention claimed is:

1. A load cell for a scale, the load cell comprising:
a spring body comprising a force reception section, a force introduction section, and a deformation section, wherein the deformation section is arranged between the force reception section and the force introduction section;
a measuring device comprising at least one strain gauge coupled to the spring body and configured to detect an elastic deformation of the spring body in order to generate a temperature-dependent weight measurement signal corresponding to a weight acting upon the spring body; and
a single thermocouple coupled to the spring body with a first point of the thermocouple positioned on the force introduction section and a second point of the thermocouple positioned on the force reception section, wherein the thermocouple is configured to generate a temperature difference signal in combination with the elastic deformation detected by the at least one strain gauge,
wherein the temperature difference signal corresponds to a temperature difference between the first point positioned on the force introduction section and the second point positioned on the force reception section, and
wherein the temperature-dependent weight measurement signal and the temperature difference signal are configured to be used together by an evaluation unit to calculate a temperature-compensated weight of the weight acting upon the spring body.

2. The load cell in accordance with claim 1,
wherein the at least one strain gauge and a conductor of the thermocouple is produced from the same material.

3. The load cell in accordance with claim 1,
wherein the thermocouple comprises two electrical conductors composed of different materials.

4. The load cell in accordance with claim 1,
further comprising a temperature sensor configured to measure an absolute temperature of the spring body.

5. The load cell in accordance with claim 1,
wherein the thermocouple comprises two electrical conductors, with at least one of the two conductors additionally comprising a temperature-dependent electrical resistor element.

6. The load cell in accordance with claim 1,
further comprising the evaluation unit configured to calculate the temperature-compensated weight from the temperature-dependent weight measurement signal and from the temperature difference signal.

7. The load cell in accordance with claim 6,
wherein the evaluation unit for calculating the temperature-compensated weight is further configured for evaluating the weight measurement signals of the measuring device.

8. The load cell in accordance with claim 6,
wherein the evaluation unit is configured such that the temperature-compensated weight is calculated continuously from the respective currently generated weight measurement signal and the respective currently measured temperature difference.

9. The load cell in accordance with claim 6,
wherein a linear or quadratic function is used as the basis for the calculation of the temperature-compensated weight from the generated weight measurement signal and from the measured temperature difference.

10. The load cell in accordance with claim 6, wherein the thermocouple comprises two electrical conductors, with at least one of the two conductors additionally comprising a temperature-dependent electrical resistor element; and wherein the evaluation unit is adapted to apply a DC current having a predefined polarity to the thermocouple and subsequently to apply a DC current of the opposite polarity and in so doing to measure the respective voltage dropping at the thermocouple and to determine an absolute temperature and/or a temperature difference from the two measured voltages.

11. The load cell in accordance with claim 6,
wherein the thermocouple comprises two electrical conductors, with at least one of the two conductors additionally comprising a temperature-dependent electrical resistor element; and wherein the evaluation unit is adapted to apply an AC voltage to the thermocouple, to measure the effective value of the voltage dropping at the thermocouple in this respect, and to calculate an absolute temperature herefrom; and/or
wherein the evaluation unit is adapted to measure the voltage dropping at the thermocouple with a thermocouple having neither current nor voltage applied and to determine a temperature difference herefrom.

12. A scale having a load cell, the load cell comprising:
a spring body comprising a force reception section, a force introduction section, and a deformation section, wherein the deformation section is arranged between the force reception section and the force introduction section;
a measuring device comprising at least one strain gauge coupled to the spring body and configured to detect an elastic deformation of the spring body in order to generate a temperature-dependent weight measurement signal corresponding to a weight acting upon the spring body; and
a single thermocouple coupled to the spring body with a first point of the thermocouple positioned on the force introduction section and a second point of the thermocouple positioned on the force reception section, wherein the thermocouple is configured to generate a temperature difference signal in combination with the elastic deformation detected by the at least one strain gauge,
wherein the temperature difference signal corresponds to a temperature difference between the first point positioned on the force introduction section and the second point positioned on the force reception section, and
wherein the temperature-dependent weight measurement signal and the temperature difference signal are configured to be used together by an evaluation unit to calculate a temperature-compensated weight of the weight acting upon the spring body.

13. The scale in accordance with claim 12,
wherein the evaluation unit is provided that is adapted to calculate a temperature-compensated weight from the generated temperature-dependent weight measurement signal and from the measured temperature difference.

14. The scale in accordance with claim 12,
wherein the evaluation unit for calculating the temperature-compensated weight is further configured for evaluating the temperature-dependent weight measurement signals of the measuring device.

15. The load cell in accordance with claim 12,
wherein the evaluation unit is configured such that the temperature-compensated weight is calculated continuously from the respective currently generated temperature-dependent weight measurement signal and the respective currently measured temperature difference.

16. The scale in accordance with claim 12,
wherein a linear or quadratic function is used as the basis for the calculation of the temperature-compensated weight from the generated weight measurement signal and from the measured temperature difference.

17. The load cell in accordance with claim 12,
wherein the thermocouple comprises two electrical conductors, with at least one of the two conductors additionally comprising a temperature-dependent electrical resistor element; and wherein the evaluation unit is adapted to apply a DC current having a predefined polarity to the thermocouple and subsequently to apply a DC current of the opposite polarity and in so doing to measure the respective voltage dropping at the thermocouple and to determine an absolute temperature and/or a temperature difference from the two measured voltages.

18. The scale in accordance with claim 12,
wherein the thermocouple comprises two electrical conductors, with at least one of the two conductors additionally comprising a temperature-dependent electrical resistor element; and wherein the evaluation unit is adapted to apply an AC voltage to the thermocouple, to measure the effective value of the voltage dropping at the thermocouple in this respect, and to calculate an absolute temperature herefrom; and/or
wherein the evaluation unit is adapted to measure the voltage dropping at the thermocouple with a thermocouple having neither current nor voltage applied and to determine a temperature difference herefrom.

19. A method relating to the operation of a scale having a load cell, the method comprising:
generating a temperature-dependent weight measurement signal that corresponds to a weight acting on a spring body, wherein the spring body comprises a force reception section, a force introduction section, and a deformation section, and wherein the deformation section is arranged between the force reception section and the force introduction section;
generating a temperature difference signal with a single thermocouple coupled to the spring body with a first point of the thermocouple positioned on the force introduction section and a second point of the thermocouple positioned on the force reception section, wherein the temperature difference signal corresponds to a temperature difference between the first point of the spring body and the second point of the spring body; and
calculating a temperature-compensated weight with an evaluation unit from the generated temperature-dependent weight measurement signal and from the generated temperature difference signal.

* * * * *